July 5, 1966 E. T. PRIEBE 3,259,438
WHEEL COVER
Filed June 5, 1964

INVENTOR.
Edward T. Priebe
BY
Herbert Furman
ATTORNEY

United States Patent Office 3,259,438
Patented July 5, 1966

3,259,438
WHEEL COVER
Edward T. Priebe, Roseville, Mich., assignor to General Motors Corporation, Detroit, Mich., a corporation of Delaware
Filed June 5, 1964, Ser. No. 372,838
8 Claims. (Cl. 301—37)

This invention relates to wheel covers and more particularly to a wheel cover having improved self-retaining means for mounting the cover on a portion of a vehicle wheel.

One feature of this invention is that it provides an improved wheel cover. Another feature of this invention is that it provides an improved wheel cover having retention means mounted in cantilever relationship to the cover body. A further feature of this invention is that it provides a wheel cover having a plurality of finger extensions, each of which mounts a pair of retaining fingers. Yet another feature of this invention is that the finger extensions are located in cantilever relationship to the wheel body and the retaining fingers are located in parallel relationship to each other. Yet a further feature of this invention is that the finger extensions and the retaining fingers are formed integral with the cover body.

These and other features of the wheel cover of this invention will be readily apparent from the following specification and drawings wherein.

Figure 1:
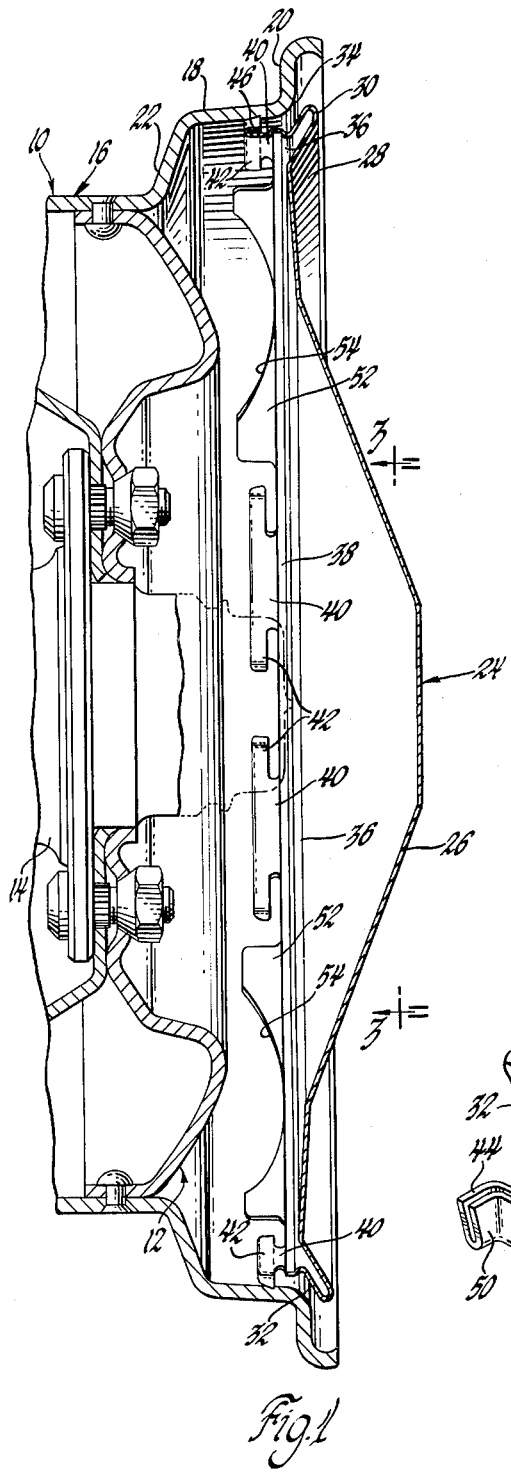
FIGURE 1 is a sectional view of a vehicle wheel having a wheel cover according to this invention mounted thereon.
Figure 2:
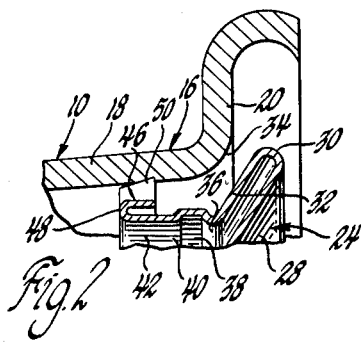
FIGURE 2 is an enlarged view of a portion of FIGURE 1.
Figure 3:
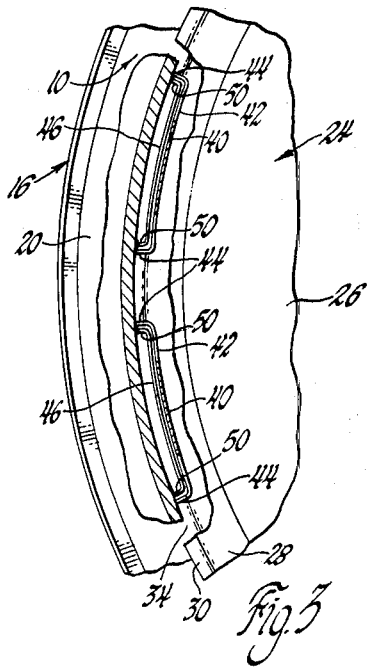
FIGURE 3 is a partially broken away view taken generally along the plane indicated by line 3—3 of FIGURE 1.
Figure 4:
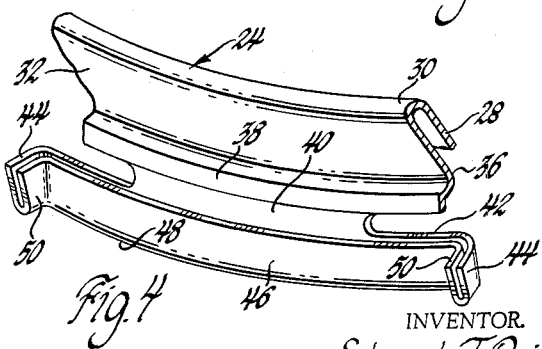
FIGURE 4 is an enlarged perspective view of a finger extension and retaining fingers.

Referring now particularly to FIGURE 1 of the drawings, a vehicle wheel designated generally 10 includes a wheel body or spider 12 which is bolted to the vehicle axle 14 in order to mount the wheel on the vehicle. An annular wheel rim 16 is riveted or otherwise suitably secured to the wheel body 10 and includes a generally radially and outwardly extending intermediate flange 18 which merges at its axially outer end into a radially outwardly extending terminal flange 20 and at its axially inner end into a generally radially and axially inwardly extending flange 22. The wheel 10 is of conventional construction and the details thereof form no part of this invention.

A wheel cover designated generally 24 includes a central cover body 26 which covers the wheel body 10 and the flanges 18 and 22 of the wheel rim to conceal them from view. The cover body includes a generally radially and axially outwardly extending peripheral flange or flange portion 28 which merges on a return bent periphery or margin 30 with a generally axially and radially inwardly extending flange or flange portion 32 located in parallel spaced relationship to the flange 28 and adapted to be located in spaced relationship to the annular shoulder 34 between the flanges 18 and 20. Flange 32 merges into a generally axially inwardly extending annular retaining flange or flange portion 36 which is provided, if desired, with a continuous circumferential annular bead or stiffening rib 38. Four equally spaced adjacent pairs of finger bodies or extensions 40 extend axially inwardly from the flange 36 in cantilever relationship thereto. Each finger extension mounts a finger assembly including a first retaining finger 42 which is circumferentially larger than the finger extension 40 and has the circumferentially spaced ends thereof turned radially outwardly to provide a pair of gripping fingers 44 which are adapted to engage the intermediate flange 18 of the wheel when the cover is mounted thereon. Each finger 42 encompasses or houses a second retaining finger 46 which is generally axially coextensive therewith and joined thereto by a return bent stiffening bead or rib 48. The fingers 46 also include axially spaced gripping fingers 50 which are radially coextensive with the fingers 44 and which are located in generally parallel adjacent closely spaced relationship thereto and grip the flange 18 when the cover is mounted thereon. It will be noted that the stiffening bead or rib 48 forms a continuous uninterrupted joint not only between the retaining fingers 42 and 46 but also between the gripping fingers 44 and 50.

Conveniently, the cover 24 may be manufactured by the process shown and described in Patent 3,103,194 Frame et al., issued September 10, 1963. The fingers 42 and 46 would be initially formed in the flat and then the fingers 46 would be bent over the fingers 42 and the ends of both fingers thereafter bent radially outwardly to provide the pairs of gripping fingers 44 and 50.

The pairs of fingers 42 and 46 are not circumferentially coextensive with the finger extensions 40 and accordingly each finger assembly functions as a cantilevered unit with respect to the flange 36. Each finger assembly is also free to function independently of the other finger assemblies, with the finger assemblies being located in four equally spaced adjacent pairs.

Upon reference to FIGURE 1, it will be noted that each adjacent pair of finger assemblies is separated from the next succeeding adjacent pair of finger assemblies by a flange extension or portion 52 which is part of the flange 36 and is provided with an arcuate cut-out 54 which naturally results from forming the cover from a blank of the least possible size. Each flange extension 52 extends between the pairs of finger assemblies and axially inwardly thereof, with each adjacent pair of finger assemblies being circumferentially housed within an adjacent pair of flange extensions 52.

Although the cover is shown with the flange 32 spaced from the shoulder 34, the flange 32 may engage the shoulder 34 if so desired.

Thus, this invention provides a wheel cover having improved self-retaining means.

What is claimed is:

1. A wheel cover including an annular cover body and a generally axially inwardly extending retaining flange portion extending therefrom, and a pair of radially spaced axially coextensive retaining fingers mounted on said flange portion, each finger including means adapted to grippingly engage a portion of a vehicle wheel.

2. A wheel cover including an annular cover body and a generally axially inwardly extending retaining flange portion extending therefrom, and a pair of axially coextensive retaining fingers mounted on said flange portion, each finger including means adapted to grippingly engage a portion of a vehicle wheel, one of said fingers being of less circumferential extent than the other and being circumferentially housed within said other finger.

3. A wheel cover including an annular cover body and a generally axially inwardly extending retaining flange portion extending therefrom, and a pair of axially coextensive retaining fingers mounted on said flange portion, each finger including means adapted to grippingly engage a portion of a vehicle wheel, said fingers being interconnected by an axially inwardly disposed reinforcing juncture radially spacing said fingers with respect to each other and permitting said fingers to function as a unit.

4. A wheel cover including an annular cover body and a generally axially inwardly extending retaining flange portion extending therefrom, a finger extension located in cantilever relationship to said flange portion, and a plurality of pairs of axially coextensive retaining fingers mounted on said finger extension, each finger including means adapted to grippingly engage a portion of a vehicle wheel.

5. A wheel cover including an annular cover body and a generally axially inwardly extending retaining flange portion extending therefrom, a pair of radially spaced axially coextensive retaining fingers, one of said fingers being secured to said flange portion and including means adapted to grippingly engage a portion of a vehicle wheel, the other of said fingers being secured to said one finger and including gripping means radially coextensive with said first gripping means for engaging said portion of said wheel.

6. A wheel cover including an annular cover body and a generally axially inwardly extending retaining flange portion extending therefrom, a finger extension located in cantilever relationship to said flange portion, and a plurality of pairs of axially coextensive retaining fingers mounted on said finger extension, each finger including means adapted to grippingly engage a portion of a vehicle wheel, said retaining fingers functioning as a unit and being of greater circumferential extent than said finger extension.

7. A wheel cover including an annular cover body and a generally axially inwardly extending retaining flange portion extending therefrom, an axially extending retaining finger mounted in cantilever relationship to said flange portion and including circumferentially spaced radially extending gripping fingers for engaging a portion of a vehicle wheel, and an axially coextensive axially extending second gripping finger radially housed within said first gripping finger and including circumferentially spaced radially extending gripping fingers radially coextensive with said first gripping fingers.

8. A wheel cover including an annular cover body and a generally axially inwardly extending retaining flange portion extending therefrom, an axially extending retaining finger mounted in cantilever relationship to said flange portion and including circumferentially spaced radially extending gripping fingers for engaging a portion of a vehicle wheel, an axially coextensive axially extending second retaining finger radially housed within said first retaining finger and including circumferentially spaced radially extending gripping fingers radially coextensive with said first gripping fingers, and a juncture rib interconnecting the axially inner edge portions of said retaining fingers and said gripping fingers.

References Cited by the Examiner

UNITED STATES PATENTS 3,022,112 2/1962 Mulhern _____ 301—37
3,181,915 5/1965 Spisak _____ 301—37

FOREIGN PATENTS 517,856 3/1955 Italy.

BENJAMIN HERSH, *Primary Examiner.*

R. J. JOHNSON, *Assistant Examiner.*